United States Patent
Watanabe et al.

(10) Patent No.: US 11,750,902 B2
(45) Date of Patent: Sep. 5, 2023

(54) IMAGE SENSOR

(71) Applicant: OMRON Corporation, Kyoto (JP)

(72) Inventors: Kosuke Watanabe, Kyoto (JP); Yasuhito Uetsuji, Kyoto (JP); Yutaka Kato, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 34 days.

(21) Appl. No.: 17/621,381

(22) PCT Filed: Jun. 18, 2020

(86) PCT No.: PCT/JP2020/023992
§ 371 (c)(1),
(2) Date: Aug. 22, 2022

(87) PCT Pub. No.: WO2021/014843
PCT Pub. Date: Jan. 28, 2021

(65) Prior Publication Data
US 2022/0394164 A1    Dec. 8, 2022

(30) Foreign Application Priority Data
Jul. 23, 2019  (JP) .................................. 2019-135083

(51) Int. Cl.
*H04N 23/52*  (2023.01)
*H04N 23/55*  (2023.01)
(Continued)

(52) U.S. Cl.
CPC .............. *H04N 23/52* (2023.01); *G02B 3/14* (2013.01); *G02B 7/028* (2013.01); *G02B 26/004* (2013.01);
(Continued)

(58) Field of Classification Search
CPC ........ H04N 23/52; H04N 23/55; H04N 23/57; H04N 23/60; H04N 23/673; G02B 3/12;
(Continued)

(56) References Cited

U.S. PATENT DOCUMENTS

2006/0098114 A1   5/2006  Horii
2013/0148059 A1*  6/2013  Park .................. G02F 1/133382
                                                 349/72
(Continued)

FOREIGN PATENT DOCUMENTS

JP         2009080187 A     4/2009

OTHER PUBLICATIONS

International Search Report issued in International Appln. No PCT/JP2020/023992 dated Aug. 18, 2020. English translation provided.
(Continued)

*Primary Examiner* — Twyler L Haskins
*Assistant Examiner* — Akshay Trehan
(74) *Attorney, Agent, or Firm* — ROSSI, KIMMS & McDOWELL LLP

(57) ABSTRACT

An image sensor includes an imaging device, an optical system including a liquid lens, a temperature sensor that detects a temperature of the liquid lens, a heater that heats the liquid lens, a temperature adjuster that controls the heater to adjust the temperature of the liquid lens to a predetermined temperature, a nonvolatile memory storing property information about the liquid lens, a refractive power controller that determines, based on a target refractive power and the property information stored in the nonvolatile memory, an application voltage applicable to the liquid lens adjusted to have the predetermined temperature and applies the application voltage to the liquid lens to control a refractive power of the liquid lens to match the target refractive (Continued)

power, and an image processor. The optical system, the nonvolatile memory, and the temperature sensor are disconnectable from a body module including the refractive power controller and the image processor.

7 Claims, 6 Drawing Sheets

(51) Int. Cl.
　　　G02B 3/14　　　(2006.01)
　　　G02B 26/00　　(2006.01)
　　　G02B 7/02　　　(2021.01)
　　　H04N 23/57　　(2023.01)
　　　H04N 23/60　　(2023.01)
　　　H04N 23/67　　(2023.01)
　　　G03B 17/14　　(2021.01)
　　　G03B 17/55　　(2021.01)
　　　G02F 1/29　　　(2006.01)

(52) U.S. Cl.
　　　CPC ............ *G02B 26/005* (2013.01); *G02F 1/29* (2013.01); *H04N 23/55* (2023.01); *H04N 23/57* (2023.01); *H04N 23/60* (2023.01); *H04N 23/673* (2023.01); *G03B 17/14* (2013.01); *G03B 17/55* (2013.01)

(58) Field of Classification Search
　　　CPC ...... G02B 3/14; G02B 26/004; G02B 26/005; G02B 7/028; G02F 1/29; G03B 17/14; G03B 17/55; G03B 2217/002; G03B 2217/007
　　　See application file for complete search history.

(56) References Cited

U.S. PATENT DOCUMENTS

| | | | |
|---|---|---|---|
| 2015/0338557 A1* | 11/2015 | Nunnink | G02B 7/008 359/666 |
| 2017/0090076 A1 | 3/2017 | Nunnink | |
| 2017/0357035 A1* | 12/2017 | Nunnink | G02B 7/028 |
| 2018/0136372 A1 | 5/2018 | Patscheider et al. | |
| 2021/0124094 A1* | 4/2021 | McKay | H05B 3/0004 |
| 2021/0208388 A1* | 7/2021 | Moon | H05B 1/0244 |

OTHER PUBLICATIONS

Written Opinion issued in International Appln. No PCT/JP2020/023992 dated Aug. 18, 2020. English translatior provided.
Extended European search report issued in European Appln. No. 20844311.9 dated May 30, 2023.

* cited by examiner

IMAGE SENSOR

FIELD

The present invention relates to an image sensor including a liquid lens.

BACKGROUND

A variety of recent optical apparatuses (e.g., imaging apparatuses) include liquid lenses. A liquid lens is an optical component containing a conductive water solution and a nonconductive oil sealed in a lens holder, with the oil-water interface deforming to change the refractive power in response to a voltage applied.

The liquid lens has the refractive power versus application voltage characteristics that are dependent on temperature. Thus, the refractive power of the liquid lens may deviate from an intended value under heat from an ambient environment around the optical apparatus or from the optical apparatus energized with electricity. To avoid this, a heater may be used for maintaining the liquid lens at a constant temperature (refer to, for example, Patent Literature 1). However, individual liquid lenses have different properties. The individual liquid lenses controlled to have a constant temperature may have different refractive powers in response to the same voltage applied.

CITATION LIST

Patent Literature

Patent Literature 1: U.S. Patent Application Publication No. 2017/0090076

SUMMARY

Technical Problem

As described above, individual liquid lenses have different properties. The individual liquid lenses controlled to have a constant temperature may thus have different refractive powers in response to the same voltage applied. Producing image sensors that can correct the application voltage reflecting such differences between individual liquid lenses thus involves obtaining accurate correction information for individual image sensors (liquid lenses) by measuring the optical properties of the liquid lenses in a constant temperature environment. An image sensor used for automatic inspection and process control includes an image processing unit, such as a microprocessor unit (MPU) or a digital signal processor (DSP). The image processing unit in operation generates heat, causing the temperature of the liquid lens to rise. Accurate correction information is difficult to obtain using the image processing unit in the image sensor. Correction information may be obtained after the temperature of the liquid lens rising under heat from the image processing is saturated. In this case, obtaining correction information for individual image sensors (liquid lenses) takes time.

In response to the above issue, one or more aspects of the present invention are directed to an image sensor that corrects the application voltage to reflect differences between individual liquid lenses and can be produced efficiently.

Solution to Problem

An image sensor according to one aspect of the present invention includes an imaging device, an optical system including a liquid lens to form an image of an object on an imaging surface of the imaging device, a temperature sensor that detects a temperature of the liquid lens, a heater that heats the liquid lens, a temperature adjuster that controls the heater to adjust the temperature of the liquid lens detected by the temperature sensor to a predetermined temperature, a nonvolatile memory storing property information about the liquid lens, a refractive power controller that determines, based on a target refractive power and the property information stored in the nonvolatile memory, an application voltage applicable to the liquid lens adjusted to have the predetermined temperature and applies the application voltage to the liquid lens to control a refractive power of the liquid lens to match the target refractive power, and an image processor that performs image processing on image data received from the imaging device. At least the optical system, the nonvolatile memory, and the temperature sensor are disconnectable from a body module including at least the refractive power controller and the image processor.

More specifically, the image sensor includes a module (hereafter, a lens module) including the optical system including the liquid lens. The lens module is disconnectable from the body module that includes the image processor for performing image processing on image data received from the imaging device. The lens module disconnected from the body module can have the liquid lens unaffected by heat from the controller, thus allowing the liquid lens to be at a constant temperature during property measurement. This allows accurate property information to be obtained in a short time for determining the application voltage. The lens module includes the nonvolatile memory for storing the accurate property information and the temperature sensor for detecting the temperature of the liquid lens. The image sensor with this structure corrects the application voltage to reflect differences between individual liquid lenses and can be produced efficiently.

Further, the image sensor includes the heater for heating the liquid lens to the predetermined temperature. A response period of the liquid lens is typically shorter at higher temperatures. The image sensor thus takes a shorter period from a change in the application voltage to achieving focus than an image sensor that does not adjust the temperature of the liquid lens. The response period refers to a period taken for the optical system to have the refractive power corresponding to a set voltage after a change in the application voltage to the liquid lens.

The property information stored in the nonvolatile memory may be any information that can be used to determine the application voltage to be applied to the liquid lens to cause the liquid lens at the predetermined temperature to achieve the target refractive power. The property information may thus include relational information indicating a relationship between the refractive power of the liquid lens at the predetermined temperature and the application voltage. The relational information may indicate a relational expression indicating a relationship between the refractive power of the liquid lens at the predetermined temperature and the application voltage. The relational information may include data including combinations indicating a relationship between the refractive power of the liquid lens at the predetermined temperature and the application voltage (combinations of the application voltage and the refractive power).

In the image sensor, the property information may include a part of relational information indicating a relationship between the refractive power of the liquid lens at the predetermined temperature and the application voltage, and the refractive power controller may determine the application voltage applicable to the liquid lens based on a preset other part of the relational information, the property information read from the nonvolatile memory, and the target refractive power. The relational information may include a first parameter and a second parameter having a smaller variation resulting from an individual difference in the liquid lens than the first parameter, and the part of the relational information may include the first parameter.

Advantageous Effects

The image sensor according to the above aspects of the present invention corrects the application voltage to reflect differences between individual liquid lenses and can be produced efficiently.

DETAILED DESCRIPTION

Embodiments of the present invention will now be described with reference to the drawings.

Figure 1:
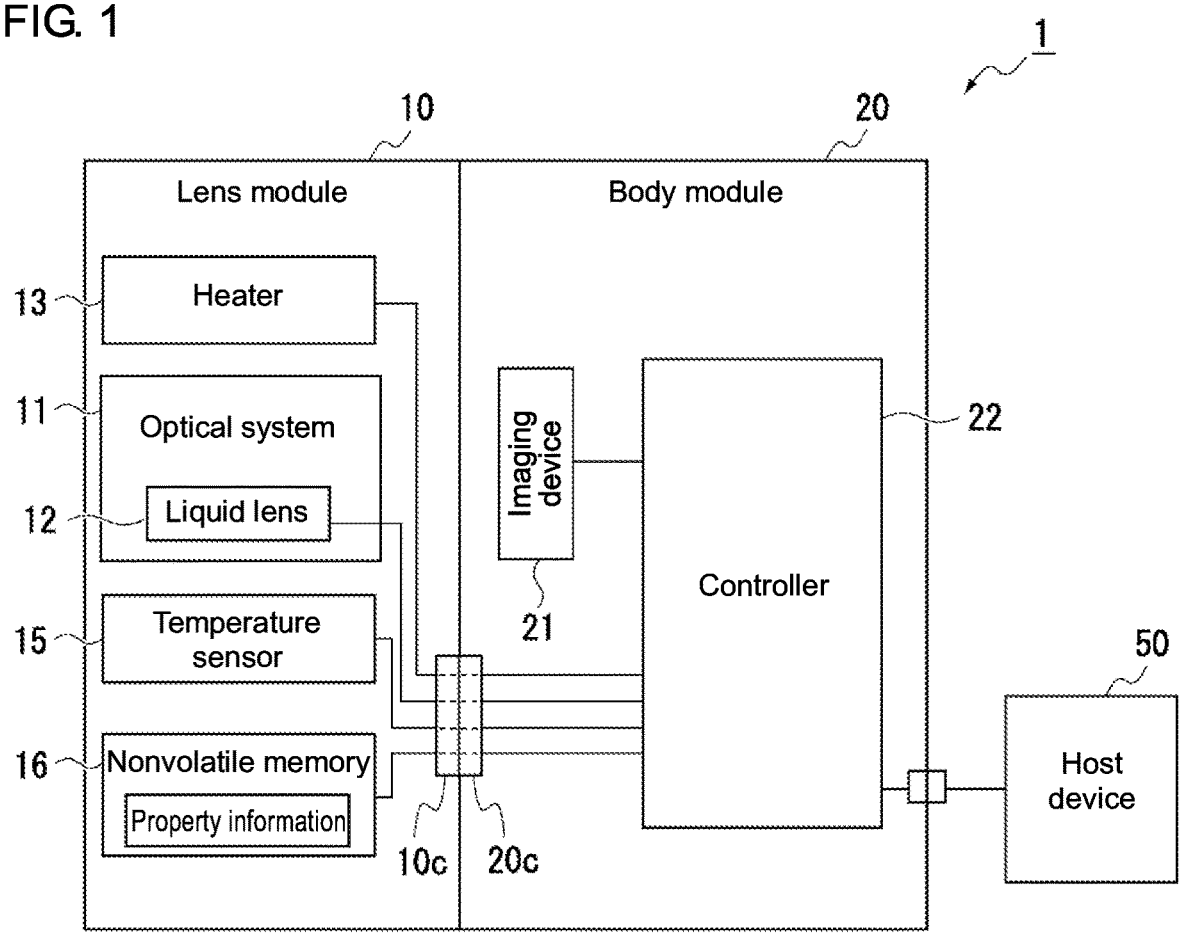
FIG. 1 is a schematic block diagram of an image sensor according to an embodiment of the present invention.

FIG. 1 is a schematic block diagram of an image sensor 1 according to an embodiment of the present invention. The image sensor 1 will be briefly described first with reference to FIG. 1.

The image sensor 1 according to the present embodiment includes a body module 20 to which a lens module 10 is attachable. The image sensor 1 is connected to a host device 50 for automatic inspection and process control when in use. The host device 50 is a computer with a program installed for using the image sensor 1. The host device 50 is typically connected to multiple image sensors 1.

The body module 20 includes an imaging device 21 and a controller 22 attached to a housing. The lens module 10 includes an optical system 11, a heater 13, a temperature sensor 15, and a nonvolatile memory 16 attached to another housing. As illustrated, the body module 20 includes a connector 20c. The lens module 10 includes a connector 10c to be fitted to the connector 20c in the body module 20 for attaching the lens module 10 to the body module 20. Further, the connector 10c is connected to the components in the lens module 10, and the connector 20c is connected to the controller 22 in the body module 20, as schematically indicated by solid and dashed lines in FIG. 1. More specifically, the image sensor 1 allows a liquid lens 12, the heater 13, the temperature sensor 15, and the nonvolatile memory 16 to be electrically connected to the controller 22 when the lens module 10 is attached to the body module 20 to have the connector 10c and the connector 20c fitted together.

The optical system 11 combines lenses to allow light from an inspection target to form an image on the imaging surface of the imaging device 21. The optical system 11 includes the liquid lens 12 with refractive power controllable in response to a different voltage being applied.

The heater 13 heats the liquid lens 12. The heater 13 may be a device that can control the amount of heat, such as a resistor or a Peltier device. The temperature sensor 15 detects the temperature of the liquid lens 12. The temperature sensor 15 is a resistance temperature detector or a temperature sensor integrated circuit (IC).

The nonvolatile memory 16 stores property information about the liquid lens 12. The property information will be described in detail later. The image sensor 1 with the above module structure (structure in which the lens module 10 including the optical system 11 including the liquid lens 12 is disconnectable from the body module 20 including the controller 22) allows property information about the individual liquid lens 12 to be set in a short time. The nonvolatile memory 16 typically uses a serial bus or a serial interface such as a serial peripheral interface (SPI) or an inter-integrated circuit (I²C), which can transmit information with a small number of signal lines, and may be a serial electrically erasable programmable read-only memory (EEPROM).

The imaging device 21 is a two-dimensional image sensing device such as a complementary metal-oxide-semiconductor (CMOS) image sensing device or a charge-coupled device (CCD) image sensing device. The imaging device 21 may be a color image sensing device or a monochrome image sensing device.

The controller 22 causes the image sensor 1 to operate as a device capable of, for example, performing visual inspection of an inspection target or reading characters, a barcode, and other information on the surface of an inspection target. The controller 22 includes, for example, a driver IC for generating an application voltage for the liquid lens 12 and a microcontroller.

Based on the above, the image sensor 1 according to the present embodiment will now be described in more detail.

The controller 22 in the image sensor 1 is designed (programmed) to perform a property information reading process, a temperature adjustment process, a refractive power control process, and an image analysis process.

The property information reading process includes reading property information from the nonvolatile memory 16 in the lens module 10 and storing the property information into the controller 22 (memory in the controller 22). The controller 22 performs the property information reading process when the image sensor 1 is powered on.

The temperature adjustment process includes controlling the heater 13 to cause the temperature of the liquid lens 12 detected by the temperature sensor 15 to reach an inspection temperature. The inspection temperature is predetermined as the temperature of the liquid lens 12 during the refractive power control process and the image analysis process (described later). The inspection temperature is higher (e.g., 60° C.) than the temperature of the liquid lens 12 that is not intentionally heated but is affected by heat from the controller 22.

The controller 22 starts the temperature adjustment process in response to an instruction from the host device 50 for starting the temperature adjustment process, and ends the process in response to an instruction from the host device 50 for ending the temperature adjustment process. The temperature adjustment process may be any process for adjusting the temperature of the liquid lens 12 to nearly the inspection temperature. The temperature adjustment process may thus involve, for example, switching on and off the current or the voltage to be supplied to the heater 13 or performing a proportional-integral-derivative (PID) control of the current or the voltage to be supplied to the heater 13.

The refractive power control process is performed by the controller 22 in response to an instruction from the host device 50, together with designation of a target refractive power, for changing the refractive power. The target refractive power refers to a target value for the refractive power of the liquid lens 12.

The property information stored (set) in the nonvolatile memory 16 in the lens module 10 will now be described before the refractive power control process is described in detail.

As shown in Formulas 1 to 3 below, the liquid lens 12 included in the image sensor 1 according to the present embodiment has refractive power P at temperature T with application voltage V expressed by a linear expression in terms of application voltage V, where the term of degree one has a coefficient of quadratic expression S(T) in terms of temperature T, and the term of degree zero has a coefficient of quadratic expression Y(T) in terms of temperature T.

$$P = S(T) \times V + Y(T) \quad (1)$$

$$S(T) = s_2 \times T^2 + s_1 \times T + s_0 \quad (2)$$

$$Y(T) = y_2 \times T^2 + y_1 \times T + y_0 \quad (3)$$

The values of $s_2$, $s_1$, $y_2$, and $y_1$ have almost no variations resulting from differences between the individual liquid lenses 12, whereas the values of $s_0$ and $y_0$ have relatively large variations resulting from differences between the individual liquid lenses 12. The values of S(T) and Y(T) have variations resulting from differences between the individual liquid lenses 12. When S(Tp) and Y(Tp) at inspection temperature Tp are determined, the application voltage for accurately (with almost no control errors resulting from differences between the individual liquid lenses 12) controlling the refractive power of the liquid lens 12 at the inspection temperature Tp is calculated using Formula 1.

Thus, in the image sensor 1 according to the present embodiment, S(Tp) and Y(Tp) are stored (set) in the nonvolatile memory 16 in the lens module 10 as property information.

Figure 2:
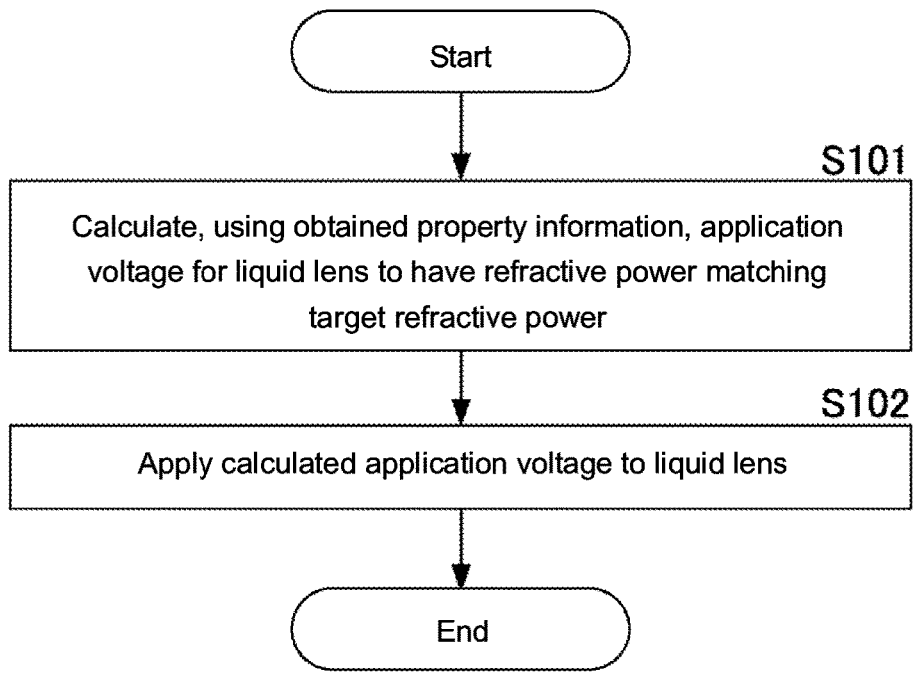
FIG. 2 is a flowchart of a refractive power control process performed by a controller in the image sensor.

The controller 22 is designed (programmed) to perform the refractive power control process shown in FIG. 2.

More specifically, the controller 22 starting the refractive power control process in response to an instruction from the host device 50 for changing the refractive power first calculates, using the property information (obtained property information in the figure) read from the nonvolatile memory 16 in the property information reading process, the application voltage that causes the liquid lens 12 to have the refractive power matching the target refractive power (step S101). The controller 22 then applies the calculated application voltage to the liquid lens 12 (step S102) and ends the refractive power control process (FIG. 2).

Figure 3:
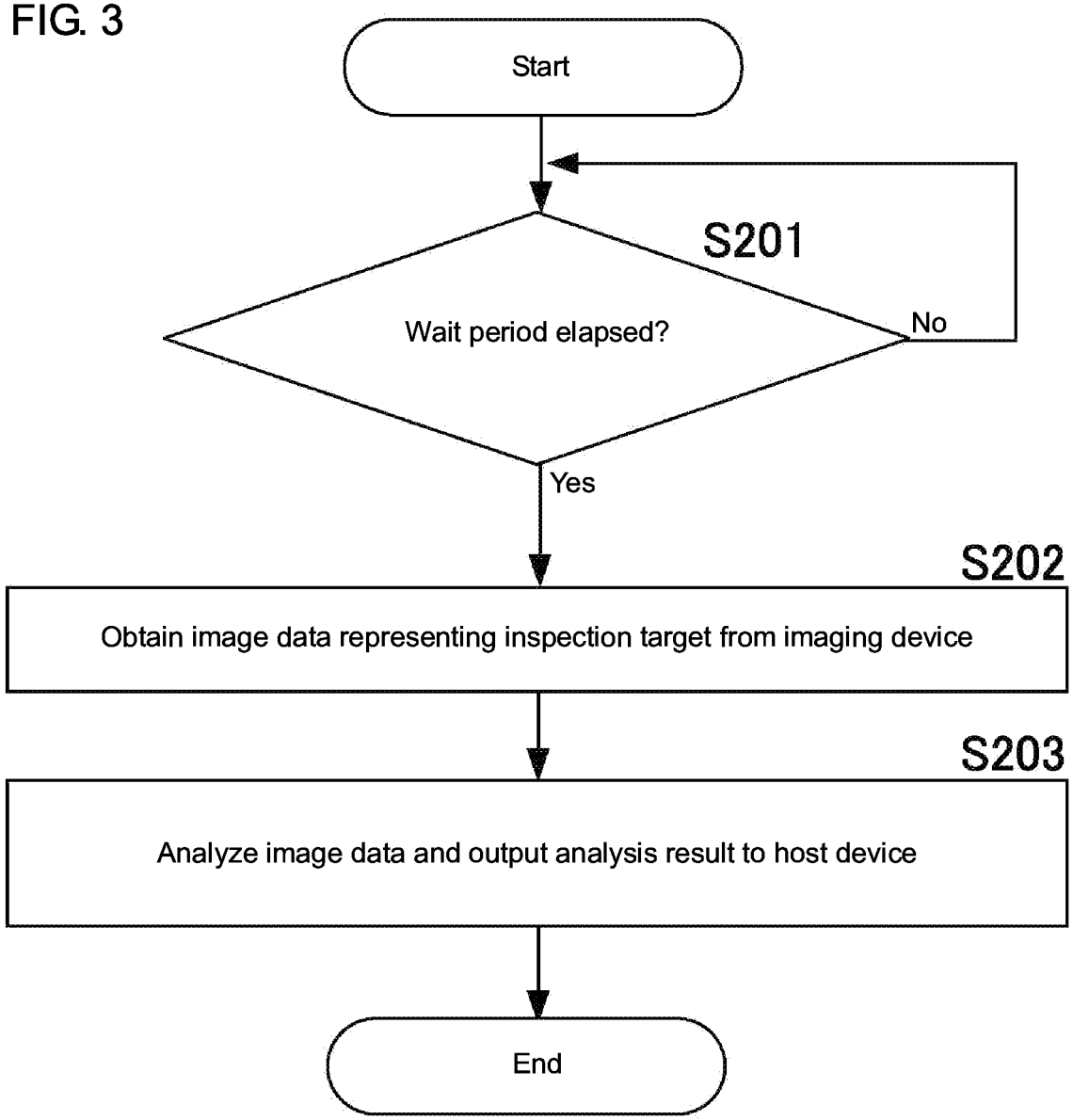
FIG. 3 is a flowchart of an image analysis process performed by the controller in the image sensor.

The image analysis process shown in FIG. 3 is performed by the controller 22 in response to an image analysis instruction from the host device 50.

More specifically, the controller 22 starting the image analysis process in response to the image analysis instruction from the host device 50 first determines whether a wait period has elapsed (step S201). More specifically, the controller 22 determines whether the elapsed time period after the completion of the last refractive power control process is longer than or equal to the wait period (step S201). The wait period is predetermined based on the period (hereafter, a response period) taken for the optical system 11 to have the refractive power corresponding to a set voltage after a change in the application voltage to the liquid lens 12 with the inspection temperature. The wait period is typically the response period.

When the wait period has elapsed (Yes in step S201), the controller 22 obtains image data representing an inspection target from the imaging device 21 (step S202). When the wait period has not elapsed (No in step S201), the controller 22 waits for the wait period to elapse in step S201 before performing step S202.

Upon ending the processing in step S202, the controller 22 performs preset image processing to analyze the obtained image data and outputs the analysis result to the host device 50 (step S203). Upon ending the processing in step S203, the controller 22 ends the image analysis process.

The procedure for setting the property information for the image sensor 1 (lens module 10) will now be described.

Figure 4:
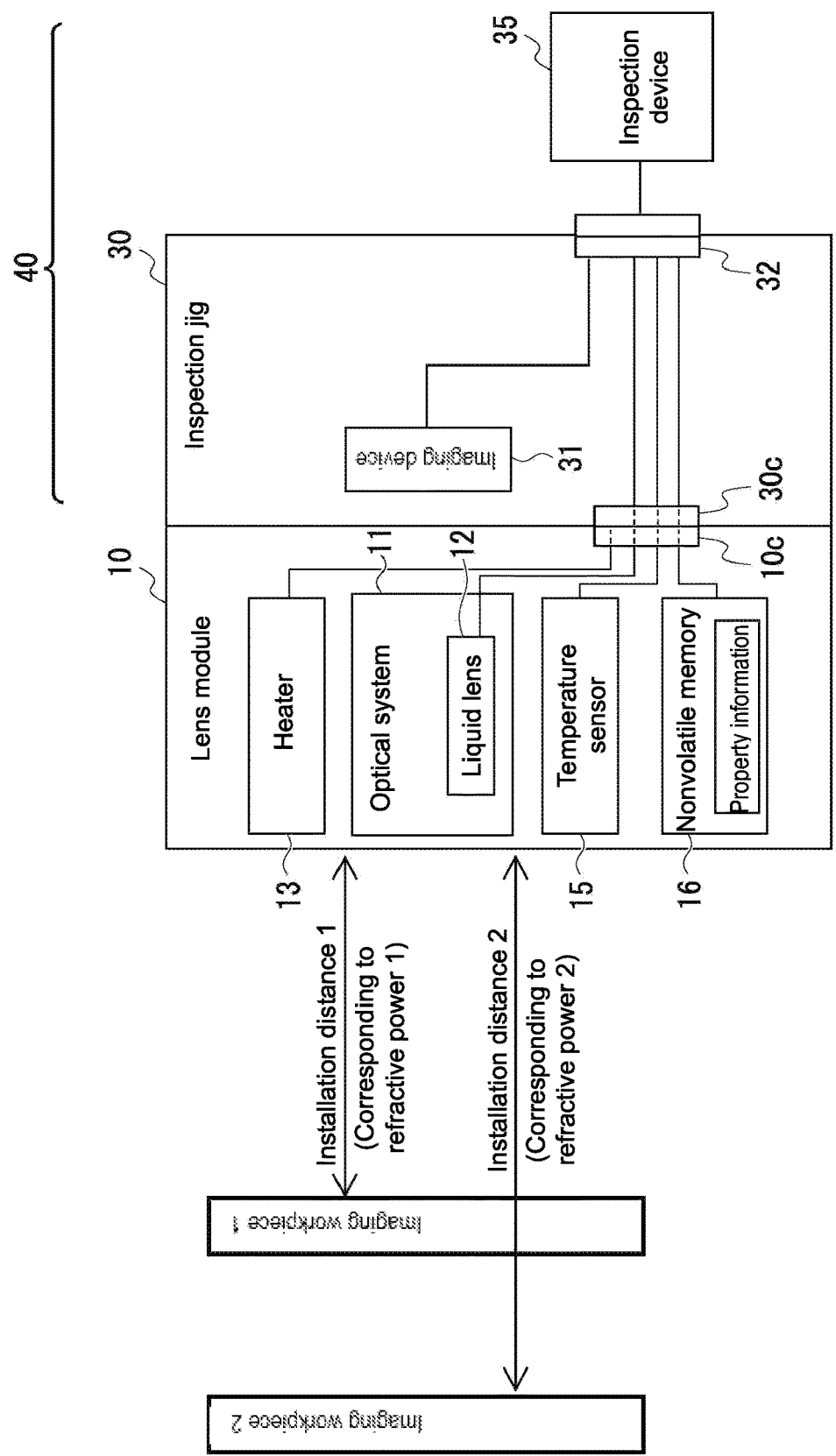
FIG. 4 is a schematic block diagram of an inspection system prepared for setting property information for the image sensor.

FIG. 4 is a schematic block diagram of an inspection system 40 prepared for setting the property information for the image sensor 1 (lens module 10). As illustrated, the inspection system 40 prepared for setting the property information for the image sensor 1 includes an inspection jig 30 and an inspection device 35.

The inspection jig 30 has a similar structure to the body module 20 excluding the controller 22. More specifically, the inspection jig 30 can receive the lens module 10. The inspection jig 30 includes a connector 30c to be fitted to the connector 10c in the lens module 10 attached (hereafter also referred to as an attached module 10). The inspection jig 30 also includes an imaging device 31. When the lens module 10 is attached to the inspection jig 30, the imaging device 31 and the optical system 11 in the attached module 10 are in the same positional relationship as the imaging device 21 and the optical system 11 in the lens module 10 attached to the body module 20.

The inspection jig 30 also includes a connector 32. The connector 32 is connected to the connector 30c and the imaging device 31 to allow the inspection device 35 to be connected to the liquid lens 12, the temperature sensor 15, the nonvolatile memory 16, and the imaging device 31 when the connector 32 is connected to the cable from the inspection device 35.

The inspection device 35 performs a property information setting process for obtaining property information about the liquid lens 12 in the attached module 10 and writing the obtained information onto the nonvolatile memory 16 in the attached module 10. As described (defined) above, the attached module 10 refers to the lens module 10 attached to the inspection jig 30.

Figure 5:
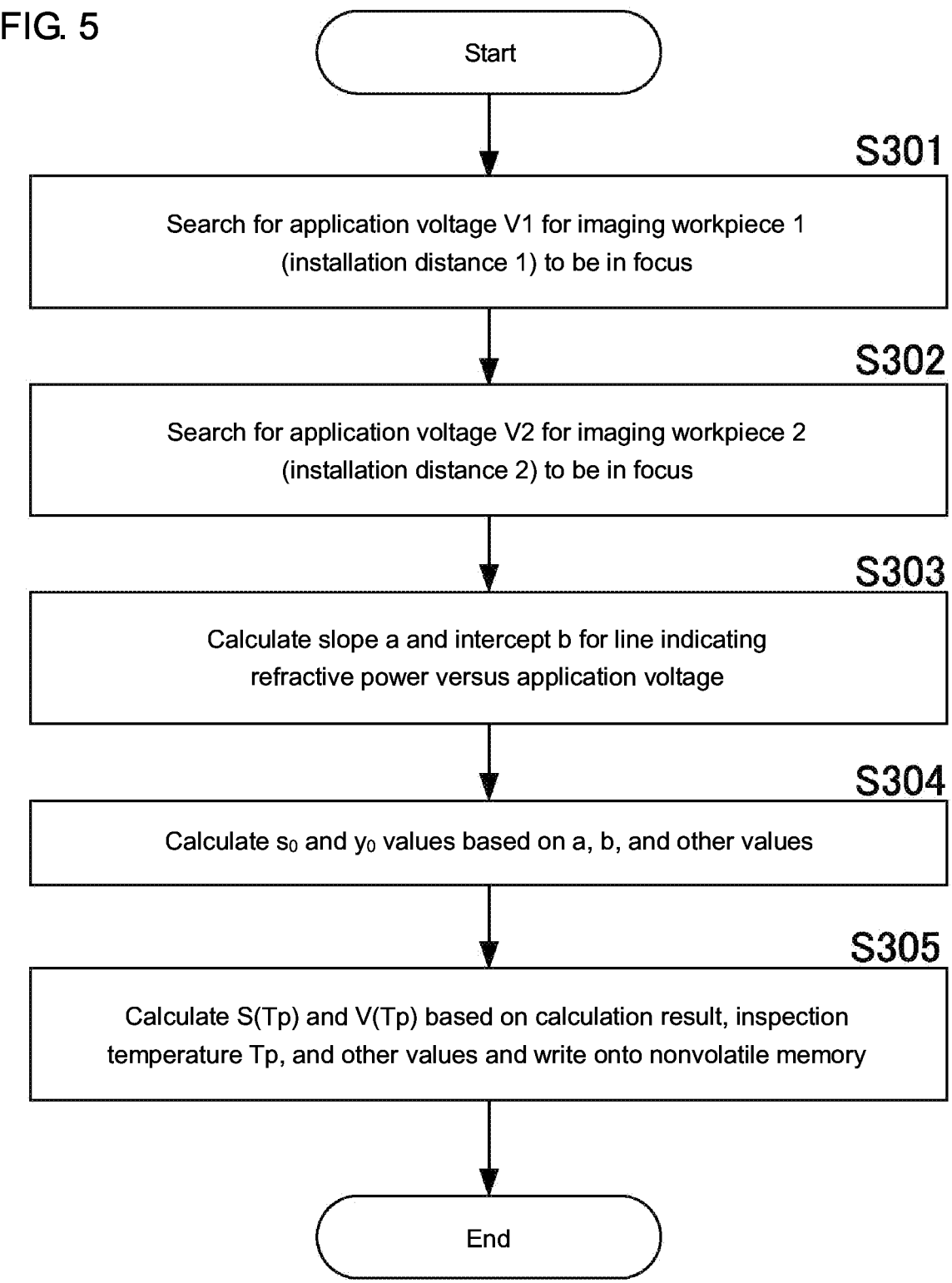
FIG. 5 is a flowchart of a property information setting process performed by an inspection device in the inspection system.

FIG. 5 is a flowchart of the property information setting process performed by the inspection device 35.

The property information setting process is performed for the attached module 10 and the inspection jig 30 controlled to have a predetermined temperature (25° C. in the present embodiment). The inspection device 35 has preset values for the coefficients $s_2$, $s_1$, $y_2$, and $y_1$ with no or small variations resulting from differences between the individual liquid lenses 12 in the coefficients in Formulas 2 and 3 described above.

As shown in FIG. 5, the property information setting process starts by searching for an application voltage V1 that causes an imaging workpiece 1 to be in focus (step S301)

and searching for an application voltage V2 that causes an imaging workpiece 2 to be in focus (step S302). As schematically shown in FIG. 4, the imaging workpieces 1 and 2 refer to objects to be used for focus adjustment placed at installation distances 1 and 2. The refractive power of the liquid lens 12 corresponding to the installation distance n (n=1, 2) is hereafter referred to as a refractive power n.

The property information setting process in the present embodiment includes steps S301 and S302 for repeatedly changing the application voltage for the liquid lens 12 and analyzing the image data received from the imaging device 31 to search for the application voltage that maximizes the contrast between adjacent pixels, and setting the search results as the application voltages V1 and V2. Steps S301 and S302 may be any processing for searching for the application voltages for focusing.

Figure 6:
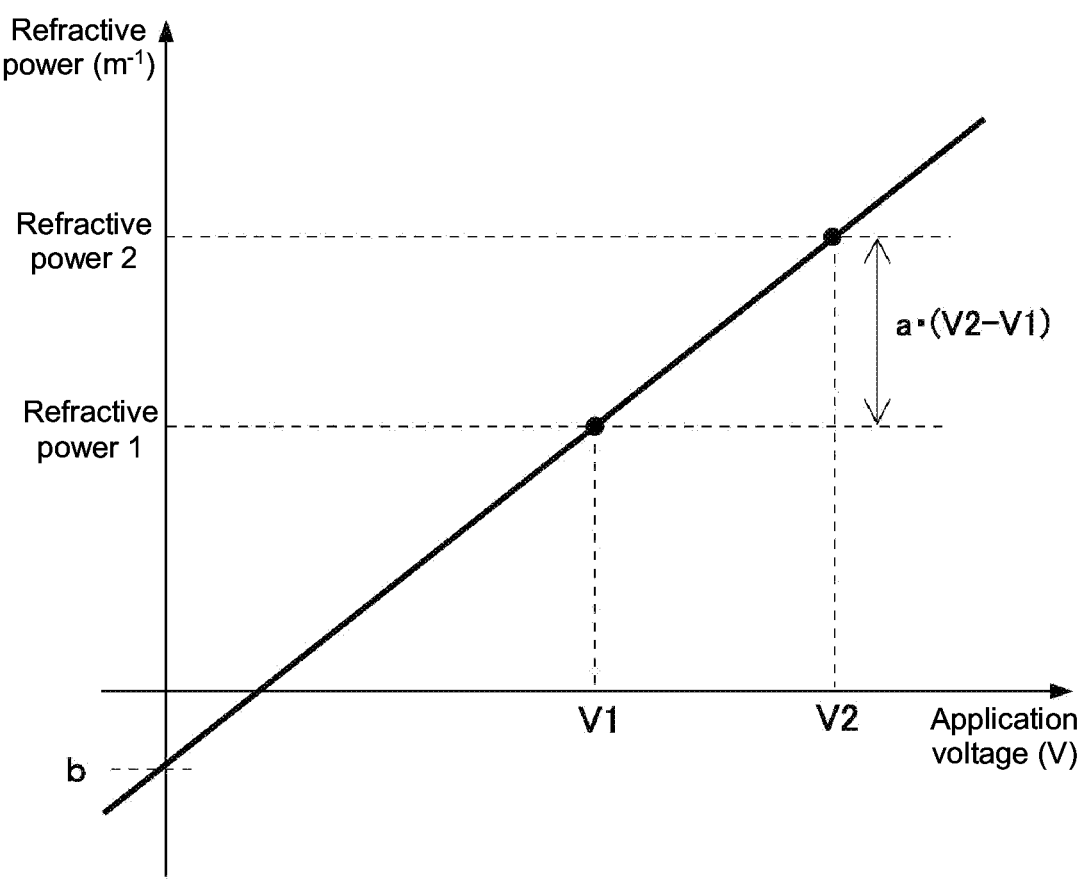
FIG. 6 is a graph describing step S303 in the property information setting process.

Upon ending of the processing in step S302, the slope a and the intercept b are calculated for the line indicating the relationship between the refractive powers 1 and 2 and the application voltages V1 and V2 (the line indicating the refractive power versus the application voltage in FIG. 5) (step S303). More specifically, as shown in FIG. 6, the slope a and the intercept b are calculated for the line passing through the coordinate point (application voltage V1, refractive power 1) and the coordinate point (application voltage V2, refractive power 2) in the Cartesian coordinates having the vertical axis indicating the refractive power and the horizontal axis indicating the application voltage.

The $s_0$ value in Formula 2 and the $y_0$ value in Formula 3 above are then calculated based on, for example, the calculated slope a and the calculated intercept b (step S304). More specifically, in step S304, the $s_0$ value is calculated by substituting the known numbers (the $s_2$, $s_1$, a, and T values) into the formula $s_0 = a - s_2 \times T^2 - s_1 \times T$. This formula is an expression for $s_0$ resulting from transforming Formula 2 in which S(T) is replaced by a. In step S304, the $y_0$ value is also calculated by substituting the known numbers (the $y_2$, $y_1$, b, and T values) into the formula $y_0 = b - y_2 \times T^2 - y_1 \times T$. This formula is an expression for $y_0$ resulting from transforming Formula 3 in which Y(T) is replaced by b.

Upon ending of the processing in step S304, S(Tp) and V(Tp) are calculated based on the $s_0$ and $y_0$ values calculated in step S304, the predetermined $s_2$, $s_1$, $y_2$, and $y_1$ values, and the inspection temperature Tp using Formulas 2 and 3 described above (step S305). The calculated values are then written onto the nonvolatile memory 16 in the attached module 10 as property information (step S305). The property information setting process thus ends.

In the image sensor 1 according to the present embodiment described above, the lens module 10 including the optical system 11 including the liquid lens 12 is disconnectable from the body module 20 including the controller 22. The lens module 10 disconnected from the body module 20 can have the liquid lens 12 unaffected by heat from the controller 22, thus allowing accurate property information for the individual liquid lens 12 used in each image sensor 1 to be obtained in a short time. The lens module 10 includes the nonvolatile memory 16 for storing the accurate property information. Thus, the controller 22 in the image sensor 1 (the controller 22 in the body module 20 with the lens module 10 attached) can correct the application voltage for the liquid lens 12 to reflect differences between the individual liquid lenses 12.

Further, in the image sensor 1, the liquid lens 12 is heated to the inspection temperature by the heater 13. The response period of the liquid lens 12 is typically shorter at higher temperatures. The image sensor 1 thus takes a shorter period from a change in the application voltage to achieving focus than an image sensor that does not adjust the temperature of the liquid lens 12.

Modifications

The image sensor 1 according to the above embodiments may be modified variously. For example, the image sensor 1 may be modified to include the nonvolatile memory 16 for storing all the coefficient values in Formulas 2 and 3 ($s_2$, $s_0$, $y_2$, $y_1$, and $y_0$) as property information and the controller 22 for calculating the application voltage to be applied to the liquid lens 12 based on the property information and the inspection temperature. The image sensor 1 may be modified to include the nonvolatile memory 16 for storing the $s_0$ and $y_0$ values (or in other words, the values with variations resulting from differences between the individual liquid lenses 12) as property information and the controller 22 for calculating the application voltage to be applied to the liquid lens 12 based on the preset coefficient values (the values of $s_2$, $s_1$, $y_2$, and $y_1$), the property information, and the inspection temperature.

For the liquid lens 12 with the refractive power that cannot be closely approximated by Formula 1 (a linear expression in terms of V), the property information may be information indicating all or some of the coefficient values in Formula 5 or 6 below. When the property information is information indicating some of the coefficient values, each of these coefficient values may be determined (selected) based on, for example, the degrees of variations resulting from differences between the individual liquid lenses 12.

[Math. 1]

$$P = \sum_{i=0}^{n} C_i \times V^i \qquad (5)$$

$$V = \sum_{i=0}^{n} D_i \times P^i \qquad (6)$$

The property information may be information indicating all or some of the coefficient values in Formula 7 or 8 below, whereas the image sensor 1 may be modified to include the controller 22 for calculating the application voltage to be applied to the liquid lens 12 using the inspection temperature.

[Math. 2]

$$P = \sum_{i=0}^{n} C_i(T) \times V^i \qquad (7)$$

$$V = \sum_{i=0}^{n} D_i(T) \times P^i \qquad (8)$$

In Formulas 5 to 8, n is an integer of 2 or greater. $C_i(T)$ (i=0 to n) in Formula 7 is a function of temperature T indicating the coefficient value of the term of degree i in Formula 5, which expresses refractive power P as an expression of degree n. $D_i(T)$ (i=0 to n) in Formula 8 is a function of temperature T indicating the coefficient value of the term of degree i in Formula 6, which expresses application voltage V as an expression of degree n.

The property information may include data including combinations of an application voltage and a refractive power of the liquid lens 12 in response to the application voltage being applied. When the data including combinations of the application voltage and the refractive power used as property information includes an application voltage associated with the target refractive power, the application voltage may be applied to the liquid lens 12. When the data does not include an application voltage associated with the target refractive power, an application voltage may be calculated based on, for example, a weighted average of two different application voltages associated with the two different refractive powers closest to the target refractive power, and the calculated application voltage may be applied to the liquid lens 12. The property information may not directly indicate the relationship between the refractive power and the application voltage. For example, the property information may indicate the relationship between a value correlated with the refractive power (e.g., a working distance) and the application voltage.

Figure 7:
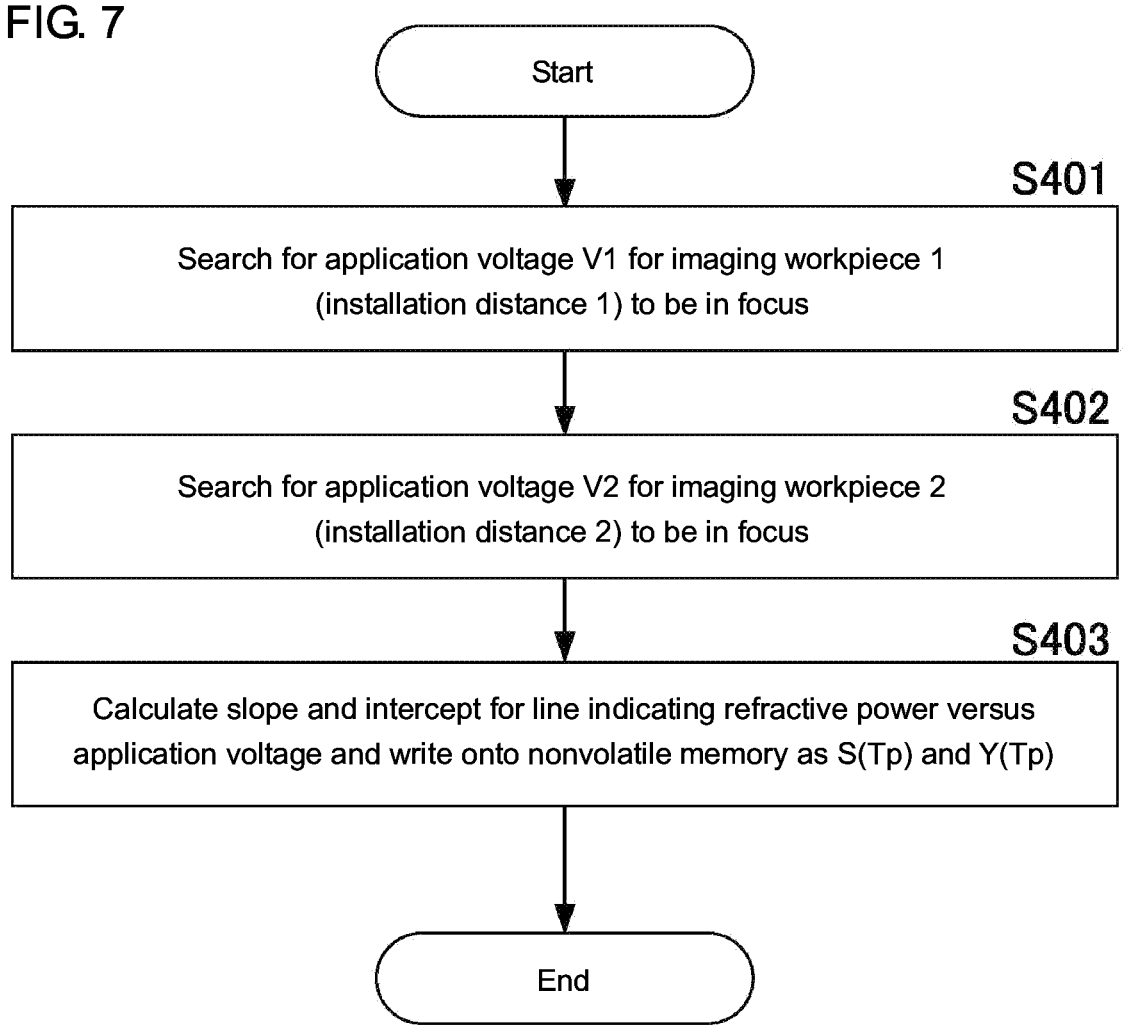
FIG. 7 is a flowchart of a second property information setting process for setting the property information.

When setting the property information for the nonvolatile memory 16, the attached module 10 may be controlled to have the inspection temperature Tp, and the second property information setting process shown in FIG. 7 may be performed instead of the property information setting process (FIG. 5) described above. The second property information setting process includes steps S401 and S402, which are identical to steps S301 and S302 in the property information setting process. When the attached module 10 is controlled to have the inspection temperature Tp, the slope and the intercept for the line indicating the refractive power versus the application voltage, or indicating the relationship between the refractive powers 1 and 2 and the application voltages V1 and V2, are respectively used as S(Tp) and V(Tp) (refer to Formula 1 described above). In the second property information setting process, the slope and the intercept for the line indicating the refractive power versus the application voltage are thus written onto the nonvolatile memory 16 in the attached module 10 as S(Tp) for the slope and V(Tp) for the intercept (step S403), instead of steps S303 to S305.

The body module 20 in the image sensor 1 may include a module including the imaging device 21 and a module including the controller 22. The body module 20 may include a unit for controlling the heater 13 separately from the controller 22. Further, the heater 13 may be included in the body module 20, or the image sensor 1 may be modified to start adjusting the temperature of the liquid lens 12 when powered on.

APPENDIX

An image sensor (1), comprising:
an imaging device (21);
an optical system (11) including a liquid lens (12) to form an image of an object on an imaging surface of the imaging device (21);
a temperature sensor (15) configured to detect a temperature of the liquid lens (12);
a heater (13) configured to heat the liquid lens (12);
a temperature adjuster (22) configured to control the heater (13) to adjust the temperature of the liquid lens (12) detected by the temperature sensor (15) to a predetermined temperature;
a nonvolatile memory (16) storing property information about the liquid lens (12);
a refractive power controller (22) configured to determine, based on a target refractive power and the property information stored in the nonvolatile memory (16), an application voltage applicable to the liquid lens (12) adjusted to have the predetermined temperature and apply the application voltage to the liquid lens (12) to control a refractive power of the liquid lens (12) to match the target refractive power; and
an image processor (22) configured to perform image processing on image data received from the imaging device (21),
wherein at least the optical system (11), the nonvolatile memory (16), and the temperature sensor (15) are disconnectable from a body module (20) including at least the refractive power controller (22) and the image processor (22).

REFERENCE SIGNS LIST 1 image sensor
10c, 20c, 30c, 32 connector
10 lens module
11 optical system
12 liquid lens
13 heater
15 temperature sensor
16 nonvolatile memory
20 body module
21, 31 imaging device
22 controller
30 inspection jig
35 inspection device
40 inspection system
50 host device

The invention claimed is:

1. An image sensor, comprising:
an imaging device;
an optical system including a liquid lens to form an image of an object on an imaging surface of the imaging device;
a temperature sensor configured to detect a temperature of the liquid lens;
a heater configured to heat the liquid lens;
a temperature adjuster configured to control the heater to adjust the temperature of the liquid lens detected by the temperature sensor to a predetermined temperature;
a nonvolatile memory storing property information about the liquid lens;
a refractive power controller configured to determine, based on a target refractive power and the property information stored in the nonvolatile memory, an application voltage applicable to the liquid lens adjusted to have the predetermined temperature and apply the application voltage to the liquid lens to control a refractive power of the liquid lens to match the target refractive power; and
an image processor configured to perform image processing on image data received from the imaging device,
wherein at least the optical system, the nonvolatile memory, and the temperature sensor are disconnectable from a body module including at least the refractive power controller and the image processor.

2. The image sensor according to claim 1, wherein
the property information includes relational information indicating a relationship between the refractive power of the liquid lens at the predetermined temperature and the application voltage.

3. The image sensor according to claim 2, wherein
the relational information indicates a relational expression indicating a relationship between the refractive power of the liquid lens at the predetermined temperature and the application voltage.

4. The image sensor according to claim 1, wherein
the property information includes a part of relational information indicating a relationship between the refractive power of the liquid lens at the predetermined temperature and the application voltage, and
the refractive power controller determines the application voltage applicable to the liquid lens based on a preset other part of the relational information, the property information read from the nonvolatile memory, and the target refractive power.

5. The image sensor according to claim 4, wherein
the relational information includes a first parameter and a second parameter having a smaller variation resulting from an individual difference in the liquid lens than the first parameter, and
the part of the relational information includes the first parameter.

6. The image sensor according to claim 5, wherein
the relational information indicates a relational expression indicating a relationship between the refractive power of the liquid lens at the predetermined temperature and the application voltage.

7. The image sensor according to claim 4, wherein
the relational information indicates a relational expression indicating a relationship between the refractive power of the liquid lens at the predetermined temperature and the application voltage.

* * * * *